(No Model.) 4 Sheets—Sheet 1.

W. SWINDELL.
GAS FURNACE.

No. 368,254. Patented Aug. 16, 1887.

Figure 2:
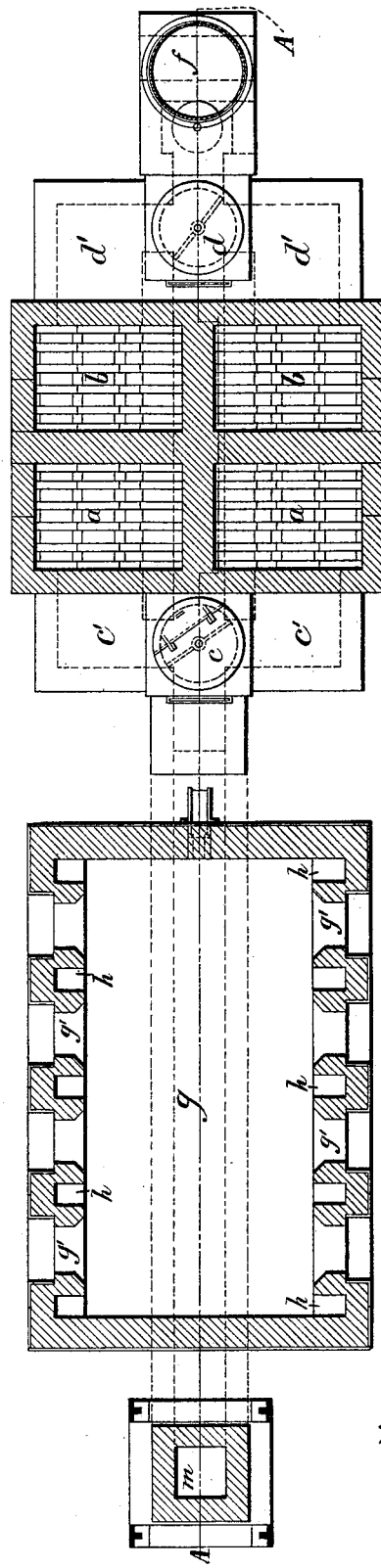

Vertical Longitudinal Section on A–A of Fig. 2.

Witnesses..
Harry L. Gill
Wm. T. Campbell

Inventor:
William Swindell
by his attys
Bakewell & Kerr (No Model.) 4 Sheets—Sheet 3.
W. SWINDELL.
GAS FURNACE.
No. 368,254. Patented Aug. 16, 1887.
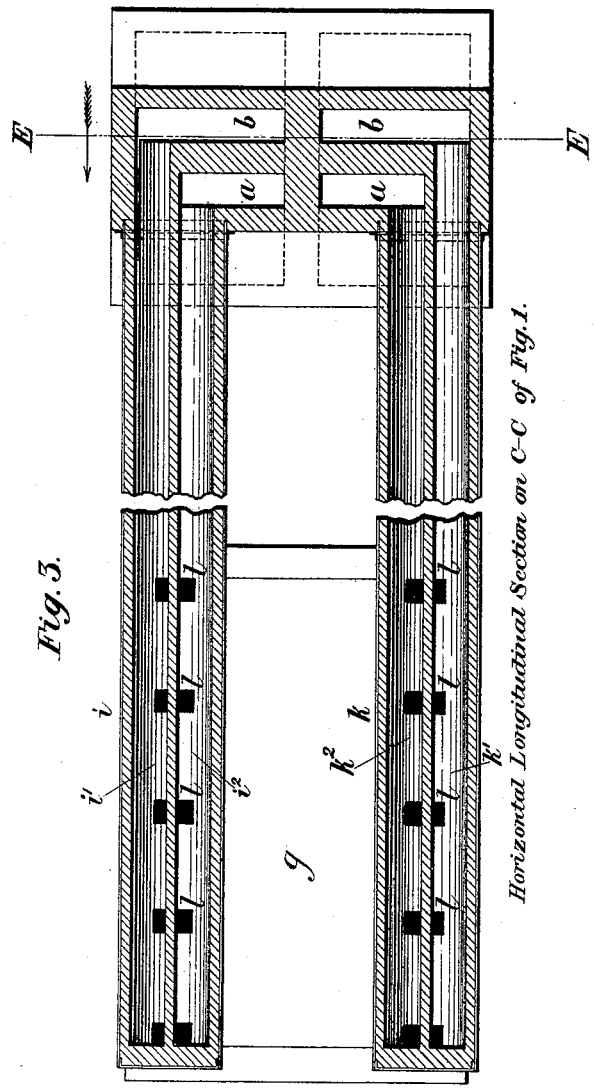
Fig. 3.
Horizontal Longitudinal Section on C-C of Fig.1.
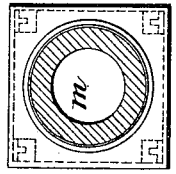
Witnesses.
Harry L. Gill
B. T. Campbell
Inventor.
William Swindell
by his attys
Bakewell & Kerr (No Model.) 4 Sheets—Sheet 4.
W. SWINDELL.
GAS FURNACE.
No. 368,254. Patented Aug. 16, 1887.
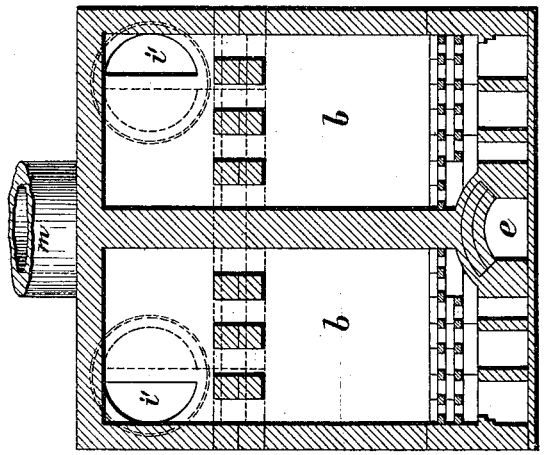
Fig. 5. *Vertical Cross Section on E E of Fig. 5.*
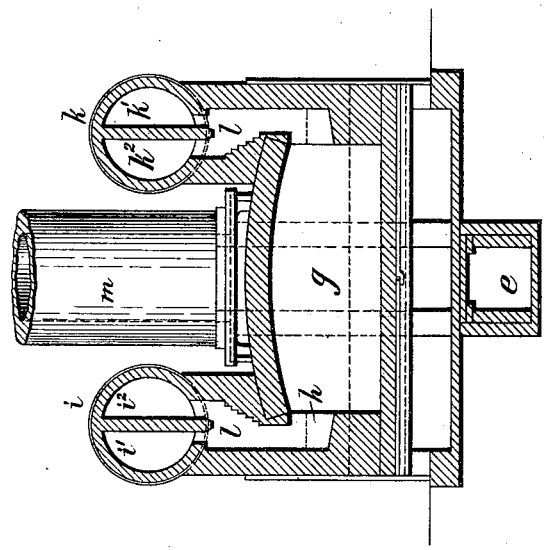
Fig. 4. *Vertical Cross Section on D D of Fig. 1.*
Witnesses.
Harry L. Gill
L. S. Campbell
Inventor.
William Swindell
by his attys
Bakewell & Kerr

United States Patent Office.

WILLIAM SWINDELL, OF ALLEGHENY CITY, PENNSYLVANIA.

GAS-FURNACE.

SPECIFICATION forming part of Letters Patent No. 368,254, dated August 16, 1887.

Application filed August 10, 1885. Serial No. 173,977. (No model.)

*To all whom it may concern:*

Be it known that I, WILLIAM SWINDELL, of Allegheny City, in the county of Allegheny and State of Pennsylvania, have invented a new and useful Improvement in Gas-Furnaces; and I do hereby declare the following to be a full, clear, and exact description thereof.

My present improvement consists of an extended application of the detached regenerator, such as is described in my application No. 171,167, filed July 10, 1885; and, broadly stated, it consists in arranging the same so that the air and gas flues therefrom shall extend on opposite sides of the bed of the furnace and parallel to each other throughout the length of the bed. The improvement is especially applicable to furnaces for heating long blanks, such as skelp-iron, rails, and similar articles.

As heretofore constructed, furnaces for heating such articles have been made with the regenerators extending along the entire length of the bed, so that the flues therefrom should communicate directly with the same. These regenerators were usually built opposite to each other under the furnace-bed, so that the flues therefrom ran directly up the side of the bed and communicated with the surface of the same through a series of ports on each side. Then when the furnace was running in either direction, the air and gas entered at one side, passed across the bed, and escaped through the flues leading to the other regenerator.

To enable others skilled in the art to make and use my improvement, I will now describe it with reference to the accompanying four sheets of drawings, in which—

Figure 1:
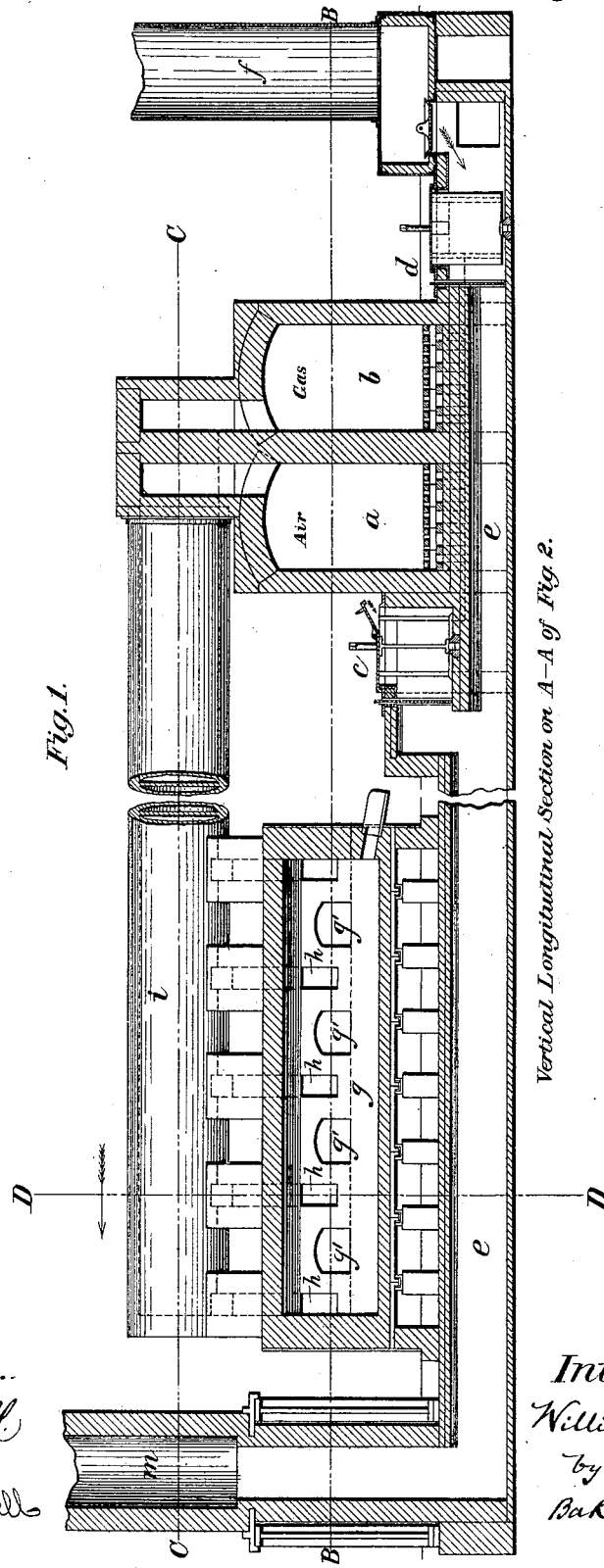

Figure 1 is a vertical longitudinal section on the line A A of Fig. 2. Fig. 2 is a horizontal section on the line B B of Fig. 1. Fig. 3 is a like section on the line C C of Fig. 1. Fig. 4 is a vertical cross-section on the line D D of Fig. 1, and Fig. 5 is a like section on the line E E of Fig. 3.

Like letters of reference indicate like parts.

The regenerators are indicated at $a\ b$, and they are provided with suitable flues, arranged in the usual manner, leading from the air-valve $c$ and gas-valve $d$, said valves being so arranged that the regenerators may be alternately thrown into and out of connection with the air-flues $c'$, gas-flues $d'$, and with the stack-flue $e$. The gas is admitted to the flues from a gas-pipe, $f$, and the air enters the open top of the valve $c$. The bed of the furnace is shown at $g$. It is provided with a series of charging-holes, $g'$, on each side, and also with adit and exit ports $h$. Leading from the upper ends of the regenerators $a\ b$, over the opposite sides of the bed, are flue-pipes $i\ k$, having a central partition, which divides each into two flues or passages, $i'\ i^2\ k'\ k^2$, one flue of each pipe communicating with one chamber of the air-regenerator $a$ and the other with one chamber of the gas-regenerator $b$, so that separate streams of air and gas will be led through the pipe ($i$ or $k$) which is acting at the adit-pipe. The air and gas find their way to the ports $h$ by means of the flues $l$, which lead down to the same, and unite in the flues $l$, and pass together in a state of combustion through the ports $h$ onto the bed $g$, accomplishing their work, and the waste products of combustion, entering the ports $h$ on the opposite side, pass up through the flues $l$ into and through the opposite flue-pipe to the exit-regenerator, and thence to the stack $m$ by means of the stack-flue $e$. It is apparent that by this arrangement the length of the bed $g$ may be extended within reasonable limits without increasing the size of the regenerators $a\ b$, so that a bed of any desired length may be obtained without the necessity of increasing the length of the regenerators, as has heretofore been necessary in order to supply the bed with heated air and gas from the same.

In the drawings I show the flue-pipes $i\ k$ as extending in parallel lines above the sides of the bed. It is apparent that they can be extended along the outer side of the bed, or placed in the ground below the sides of the bed, or directly beneath the same, and that the flues $l$ can be run to suit the location of the flues $i$ and $k$.

The regenerators $a\ b$ may be built at the end of the bed and within the same side walls, if desired, and such construction will be within my invention, because the flues connecting the regenerators and bed can be extended from the former along the sides of the latter to any desired length without changing the regenerators.

I am aware that detached regenerators in themselves are not new, and that air and gas flues extending along the entire length of the bed of the furnace in themselves are not new, and I do not desire to claim either of these elements, broadly; but

What I claim as my invention, and desire to secure by Letters Patent, is—

1. The combination, with a furnace, of detached regenerators situate at the ends of the same, and flue-pipes extending along the entire length of the bed of the furnace, and communicating with the opposite sides of the bed of the furnace by suitable ports, substantially as and for the purposes specified.

2. The combination of detached regenerators, with flue-pipes leading from each pair and divided into air and gas flues by central partitions, and a furnace-bed having adit and exit ports and flues which communicate with both flues of the flue-pipes at points opposite to the said ports, substantially as and for the purposes described.

In testimony whereof I have hereunto set my hand this 1st day of July, A. D. 1885.

WILLIAM SWINDELL.

Witnesses:
THOMAS B. KERR,
W. B. CORWIN.